(No Model.) 3 Sheets—Sheet 1.
W. A. M. BROWN & J. M. PORTER.
APPARATUS FOR MEASURING THE FLOW OF LIQUIDS.
No. 314,914. Patented Mar. 31, 1885.
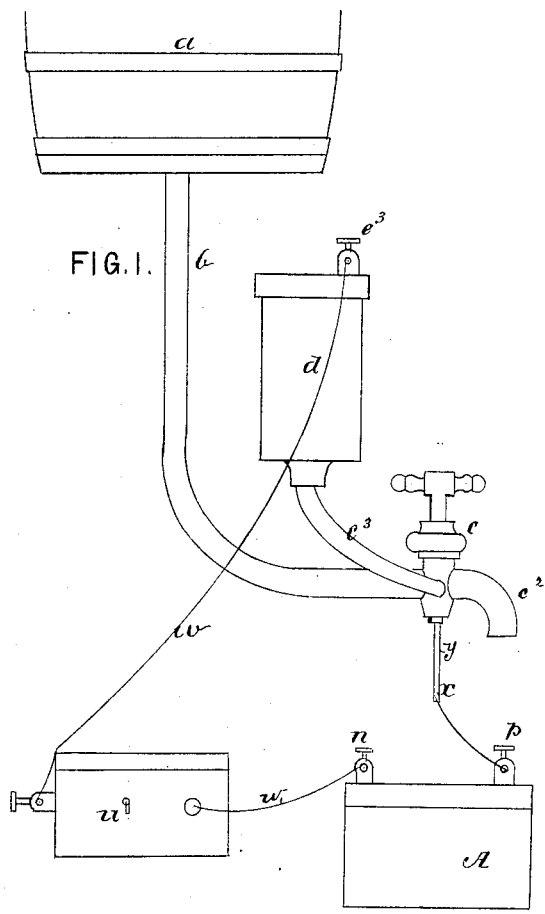
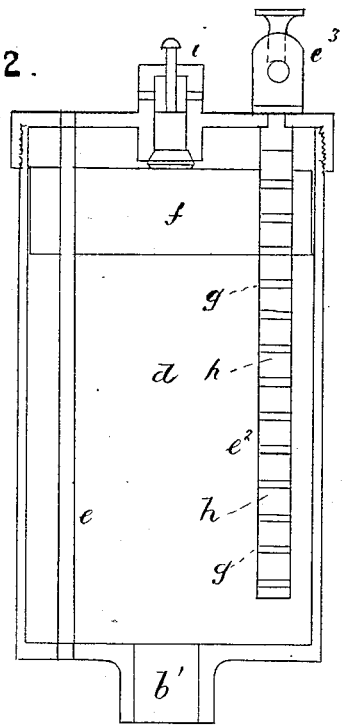
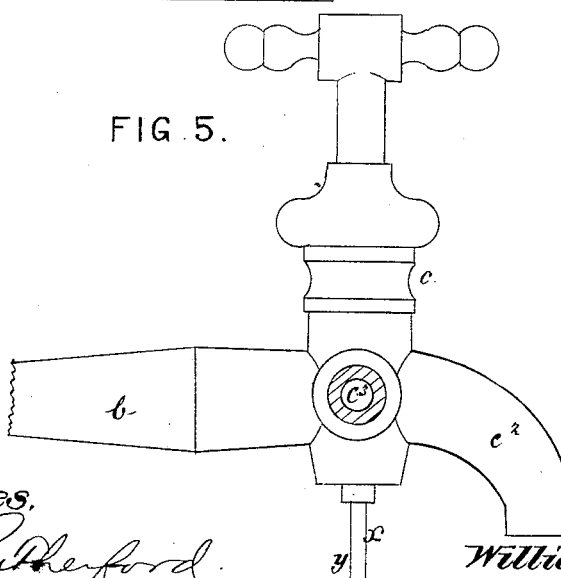
Witnesses,
J. A. Rutherford
Robert Errett
Inventors
William A. M. Brown
John M. Porter
By James L. Norris, Atty.

(No Model.) 3 Sheets—Sheet 2.

W. A. M. BROWN & J. M. PORTER.
APPARATUS FOR MEASURING THE FLOW OF LIQUIDS.

No. 314,914. Patented Mar. 31, 1885.

Witnesses.
J. A. Rutherford
Robert Everett

Inventors.
William A. M. Brown
John M. Porter
By James L. Norris.
Atty.

(No Model.) 3 Sheets—Sheet 3.

W. A. M. BROWN & J. M. PORTER.
APPARATUS FOR MEASURING THE FLOW OF LIQUIDS.

No. 314,914. Patented Mar. 31, 1885.

UNITED STATES PATENT OFFICE.

WILLIAM ALFRED MORRISON BROWN AND JOHN MEGSON PORTER, OF LEEDS, COUNTY OF YORK, ENGLAND; SAID BROWN ASSIGNOR TO FREDERICK MASKELL KING, OF SAME PLACE.

APPARATUS FOR MEASURING THE FLOW OF LIQUIDS.

SPECIFICATION forming part of Letters Patent No. 314,914, dated March 31, 1885.

Application filed November 6, 1884. (No model.) Patented in England July 31, 1884, No. 10,826.

*To all whom it may concern:*

Be it known that we, WILLIAM ALFRED MORRISON BROWN, of Guilford Street, wine and spirit merchant, and JOHN MEGSON PORTER, of Cookridge Street, architect, both in Leeds, in the county of York, England, respectively, subjects of the Queen of Great Britain, have invented certain new and useful Improvements in the Means or Apparatus Employed for Measuring or Regulating the Flow of Liquids, (for which we have obtained a patent in Great Britain, No. 10,826, dated July 31, 1884,) of which the following is a specification, reference being had to the accompanying drawings, in which similar letters of reference indicate corresponding parts.

Figure 1 is a general view of the apparatus; and Figs. 2 to 12 are detail diagrams.

$a$ is a barrel from which the liquid is being drawn by means of the pipe $b$. This pipe leads to the tap or cock $c$. This cock has its plug formed with an elbow-passage, as shown at $c'$, Figs. 6 and 7. When the plug is turned, as shown in Fig. 6, it allows liquor to flow from the cask $a$ into the vessel $d$ and stops it off from the spout $c^2$; but when it is necessary to draw liquor out through the delivery-nozzle $c^2$ into a glass or other suitable measure for consumption, the turning of the tap for that purpose shuts off the supply from the cask $a$. The vessel $d$ is formed with a glass or metal barrel or cylinder, the top and bottom covers being usually of metal. The lower cover is fitted at $b'$ to the end of the pipe $c^3$. The top cover of the vessel $d$ is fitted with two metallic rods, $e$ $e^2$, which act as conductors of the electric current, hereinafter referred to. The rod $e$ is connected with the top or bottom cover, or with both, and is in electric communication with the conductor $v$, Fig. 7, either through the metallic parts intervening between said rod and conductor $v$ or otherwise, and the rod $e^2$ passes through the cover and is placed in electric communication with the terminal $e^3$, and is insulated from the metal cover.

$f$ is a floating piston, which floats upon or in the liquor. The rod $e$ is a simple metallic rod without any non-conducting material. The rod $e^2$ consists of an internal rod similar to $e$, but surrounded with a series of rings of conducting material, $g$, and non-conducting material $h$. The float $f$, Figs. 2, 3, 4, and 10, is fitted to slide on the rods $e$ $e^2$, and it also has a slight metallic conductor, $f'$, as shown in Figs. 3 and 10. When $f'$ is in communication or contact with one of the rings $g$, the electrical current freely passes between the terminals $e'$ and $e^3$; but when the conductor $f'$ is in contact with one of the non-conductors $h$ the electric current is interrupted. When liquor is withdrawn from the vessel $d$ through the tap $c$, the float descends, and, as it descends, the current is alternately completed and broken by the contact of $f$ with $e^2$. An air-valve, $i$, is fitted in the cover to admit air when the piston is descending and the liquor being withdrawn. When the piston $f$ is floated to the position shown in Fig. 2, the contact of the piston with the valve closes the latter and prevents the further egress of air and loss of liquor. In Fig. 3 this valve is shown open.

$n$ is an armature, which is alternately drawn and repulsed by the magnets.

$o$ is an upright bar pivoted at its lower end at the point $p$ and carrying the propelling-bar $q$ and detent-pawl $r$, whereby the wheel $s$ and the connected counting apparatus is actuated in a manner well known. The spring $x$ and regulating-screw $t$ regulate the force applied to the bar $o$, a curved plate-spring, $u$, bearing against the heels of the bar $q$ and pawl $r$, serving to hold the latter in engagement with the wheel $s$.

The whole of the counting apparatus is placed in a box, $u$, which may be kept locked, and wires $w$ $w$ are placed in position to communicate with the electro-magnets, the battery, and the tap $c$. The battery may be suitably inclosed in a case, as at A, Fig. 1, any ordinary battery or other electrical current being used for that purpose.

Figure 7:
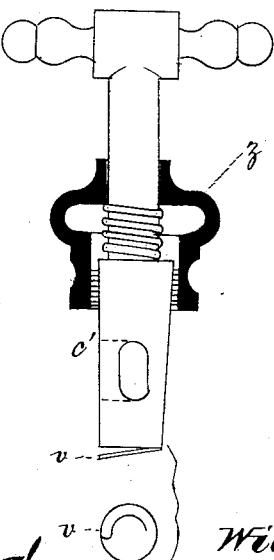
Figure 8:
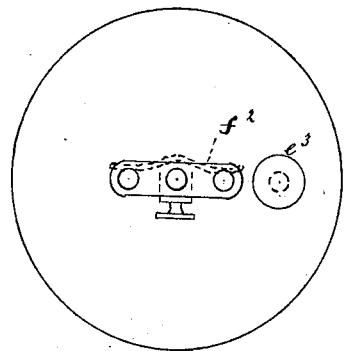
Fig. 8 is a diagram of the top cover of Fig. 4.
Figure 9:
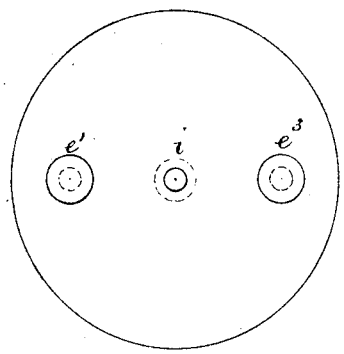
Fig. 9 is a diagram of the top cover of the vessel $d$. (Shown in Figs. 2 and 3.)
Figure 10:
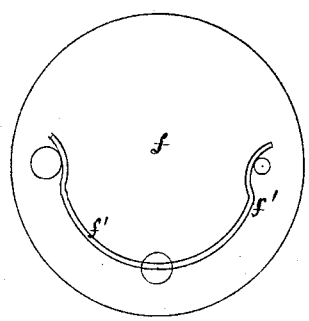
Figure 11:
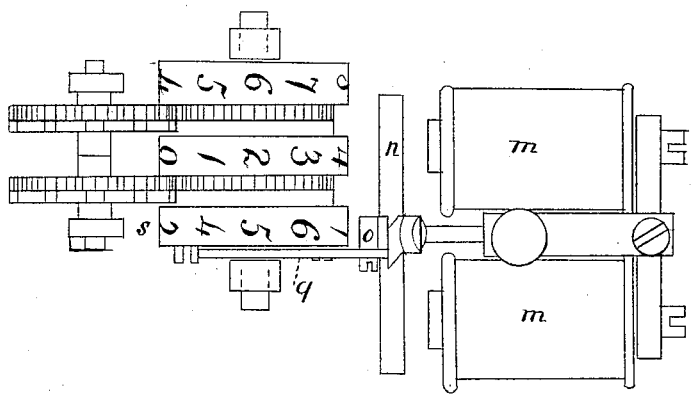
Figs. 11 and 12 are respectively plan view and elevation of an ordinary counting apparatus actuated by electro-magnets. $m$ $m$ are the magnets.
Figure 12:
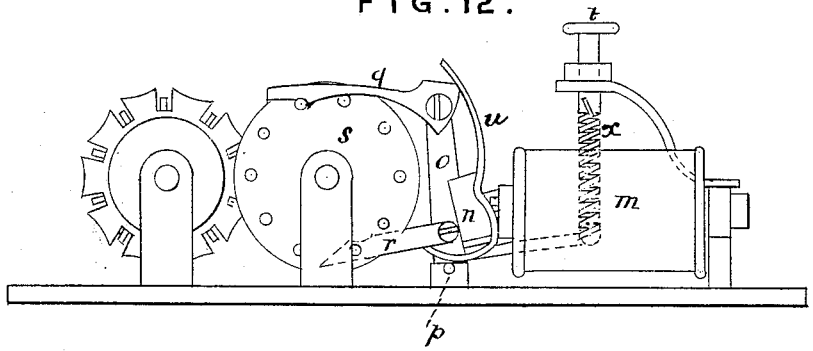

When the liquor is being admitted from the barrel $a$ to the vessel $d$, it is necessary to prevent electrical contact. This is effected by means of the wire $x$, Figs. 1 and 5, which is in communication with the battery. This wire is partly inclosed in insulating material at $y$. The lower end of the plug, Fig. 7, has a small metallic spring, $v$, (shown also in plan in the same figure,) and a spring is fitted at $z$ which presses down the plug.

Figure 3:
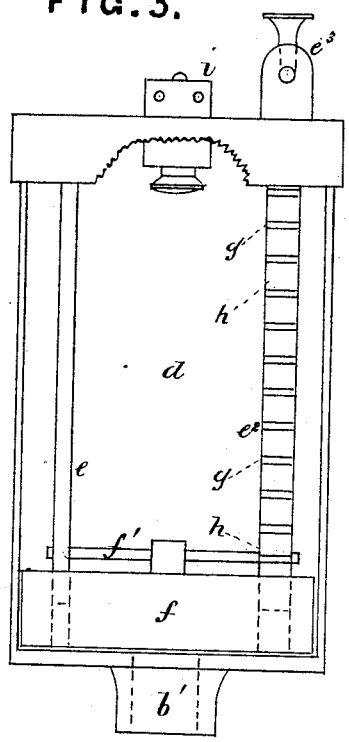
Figure 4:
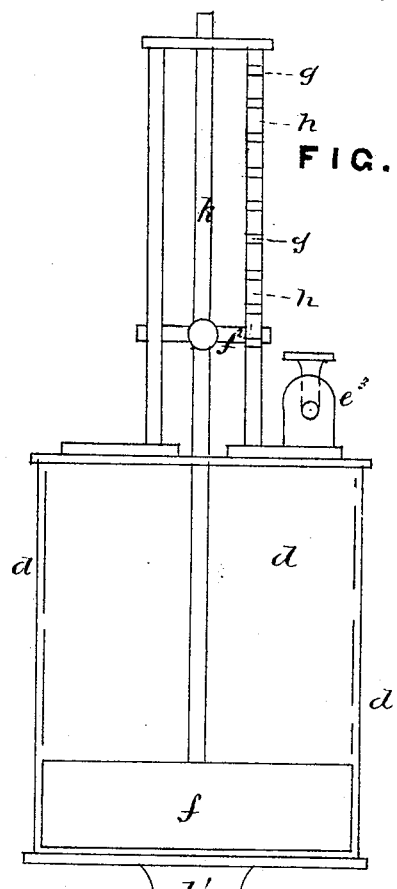
Fig. 4 shows a modification of the vessel $d$, in which the rods are mounted above the cover, the conductor $f^2$ being placed upon a rod, $k$, attached to the piston $f$ and passing freely through the cover.
Figure 6:
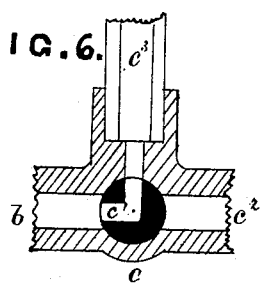

When the plug is turned, as shown in Fig. 6, to draw liquor from the cask and fill the vessel $d$, the spring $v$ will be out of contact with the wire $x$, and the electric current is thereby broken until the tap is again turned and the connection with $x$ is made.

Our invention may be applied to wine, spirits, and all other kinds of liquid, and by its use correct indications of the quantities withdrawn are made, and fraud is prevented.

Having now particularly described and ascertained the nature of our said invention and in what manner the same is to be performed, we declare that what we claim is—

1. The combination of a receiving-tank provided with a float, an electrical conductor carried by said float, a circuit-breaker for alternately opening and closing the circuit at certain stages in the movement of the float, a pipe leading from said receiving-vessel, a way-cock connected with said pipe, a pipe leading from a liquid source of supply and communicating with the receiving-vessel through said way-cock, a register having an electrical connection with said circuit breaker and closer, a battery for charging said electrical conductors, and a wire leading from said battery to a point adjacent to said cock, whereby in the movement of said cock to permit the flow of the liquid into the receiver the flow of the current through the float circuit-breaker will be stopped and when the cock is moved to cut off the flow of the liquid the current will be again established, substantially as described.

2. The combination, with the vessel $d$, of the rods $e$ and $e^2$, the conductors $g$ and non-conductors $h$, arranged in alternation on the rod $e^2$, the float $f$ within the vessel, the conductor $f'$, carried by said float, and the rods $e$ and $e^2$, substantially as described.

3. The combination of the vessel $d$, the rods $e$ and $e^2$, the conductors and non-conductors $g$ and $h$, arranged in alternation on the rod $e^2$, the float $f$, and conductor $f'$, carried by said float, pipe $c^3$, leading from vessel $d$, the way-plug $c$, connected therewith, the pipe $b$, connecting with the way-cock, the battery, the wires $w$, through which a current passes to the rod $e^2$, and the wire $x$, leading from the battery to a point adjacent to the plug of the cock $c$, substantially as described.

4. The combination of the vessel $d$, the rods $e$ and $e^2$, the conductors and non-conductors $g$ and $h$, arranged in alternation on the rod $e^2$, the float $f$, and conductor $f'$, carried by said float, the pipe $c^3$, leading from vessel $d$, the way-plug $c$, connected therewith, the pipe $b$, connected with the way-cock, the battery, the register, the wires $w$, connecting the register with the battery and with rod $e^2$, and the wire $x$, leading from the battery to a point adjacent to the plug of the cock $c$, substantially as described.

In testimony whereof we have hereunto set our hands this 14th day of October, 1884.

WILLIAM ALFRED MORRISON BROWN.
JOHN MEGSON PORTER.

Witnesses:
EDWARD WHITELEY,
JOSH. HY. WHITAKER.